United States Patent
Hofer

(10) Patent No.: US 6,546,203 B2
(45) Date of Patent: Apr. 8, 2003

(54) CAMERA WITH ADJUSTABLE STROBE ENERGY

(75) Inventor: Gregory V Hofer, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/886,448

(22) Filed: Jun. 21, 2001

(65) Prior Publication Data

US 2002/0197071 A1 Dec. 26, 2002

(51) Int. Cl.[7] .......................... G03B 15/03; H04N 5/222
(52) U.S. Cl. .................... 396/155; 348/371; 396/157
(58) Field of Search .................. 396/155, 157, 396/164; 348/370, 371

(56) References Cited

U.S. PATENT DOCUMENTS 6,151,073 A * 11/2000 Steinberg et al. ........... 348/364
6,195,127 B1 * 2/2001 Sugimoto .................... 348/234

* cited by examiner

Primary Examiner—Russell Adams
Assistant Examiner—Arthur A Smith
(74) Attorney, Agent, or Firm—David W. Boyd

(57) ABSTRACT

A camera adjusts its strobe energy to achieve proper exposure of a photograph. The adjustment method uses two trial exposures of the scene to be photographed. One trial exposure is taken without the camera strobe using only ambient illumination. The other trial exposure is taken using the camera strobe at a pre-set energy level. Pixels that appear as saturated in the ambient-only trial exposure are discounted in the determination of the strobe energy for the final photograph. This method properly exposes scenes which themselves contain bright light sources such as lamps or light fixtures.

10 Claims, 6 Drawing Sheets

(2 of 6 Drawing Sheet(s) Filed in Color)

CAMERA WITH ADJUSTABLE STROBE ENERGY

FIELD OF THE INVENTION

The present invention relates generally to photography and more specifically to a photography using a flash or strobe light.

BACKGROUND OF THE INVENTION

Cameras use a variety of techniques for achieving the proper exposure of photographs. Commonly, a camera makes one or more trial photographs of a scene using selected camera settings. These trial photographs are analyzed to determine the amount of light being captured from the scene and how the exposure should be adjusted to improve the exposure level. The camera may then adjust any of several settings before taking a final photograph so that proper exposure is achieved.

Some of the camera settings which may be adjusted include the shutter time (either mechanical or electronic), the lens aperture ratio, the electronic amplification of signals within the camera (sometimes called system gain), whether a strobe light should be fired to supplement the ambient lighting of the scene, and if so, how much energy to supply to the strobe. In some cases the user of the camera may specify some or all of the settings and require the camera to adjust any remaining settings to achieve proper exposure.

In order to determine which adjustments should be made, the camera assumes a definition of proper exposure and incorporates knowledge of how each potential adjustment will affect the exposure in the final photograph.

In the case where a strobe light is used, a method is needed to determine the proper amount of energy to supply to the strobe. The more energy supplied to the strobe, the more light the strobe emits, and the brighter the exposure of the resulting photograph.

For the purposes of this disclosure, a photograph may be a numerical representation of a scene captured by a camera, and need not be a printed representation of the scene.

A common technique for determining the proper strobe energy is to take a trial photograph with the strobe energy set to a known amount. The resulting photograph is examined and its exposure quality evaluated. If adjustment is required, a new value for the strobe energy is determined. The final photograph is then taken using the computed energy value. When some areas of the trial photograph are found to be fully exposed, the strobe energy used for the final photograph may be reduced from the energy level used for the trial photograph. One indication that an area is fully exposed is that the pixel data in that area of the photograph are saturated. To be saturated means that the digital value representing those pixels is the highest value the camera can indicate, and that additional light in those pixels will not produce a higher digital value.

However, this method often fails to produce a good result when the scene contains a small area of very bright light such as a glare reflection or a self-luminous light source such as a light fixture or lamp. The camera may assume that the very bright areas were the result of the strobe energy used in the trial photograph and underestimate the amount of strobe energy required to properly expose other parts of the scene. Alternatively, the camera may interpret the bright areas as sufficient illumination for the entire scene and choose not to use the additional strobe at all, thereby causing the photograph to be underexposed. In either case, the photograph is not exposed properly.

What is needed is a technique for setting the strobe energy properly when the scene being photographed contains small very bright areas.

SUMMARY OF THE INVENTION

Strobe energy in a camera is adjusted to improve exposure. A trial exposure of the scene using only ambient light is taken. Pixels which are found to be fully exposed, or saturated, in the ambient-only trial photograph are discounted in the computation of the strobe energy appropriate for a final photograph.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENT

Figure 1:
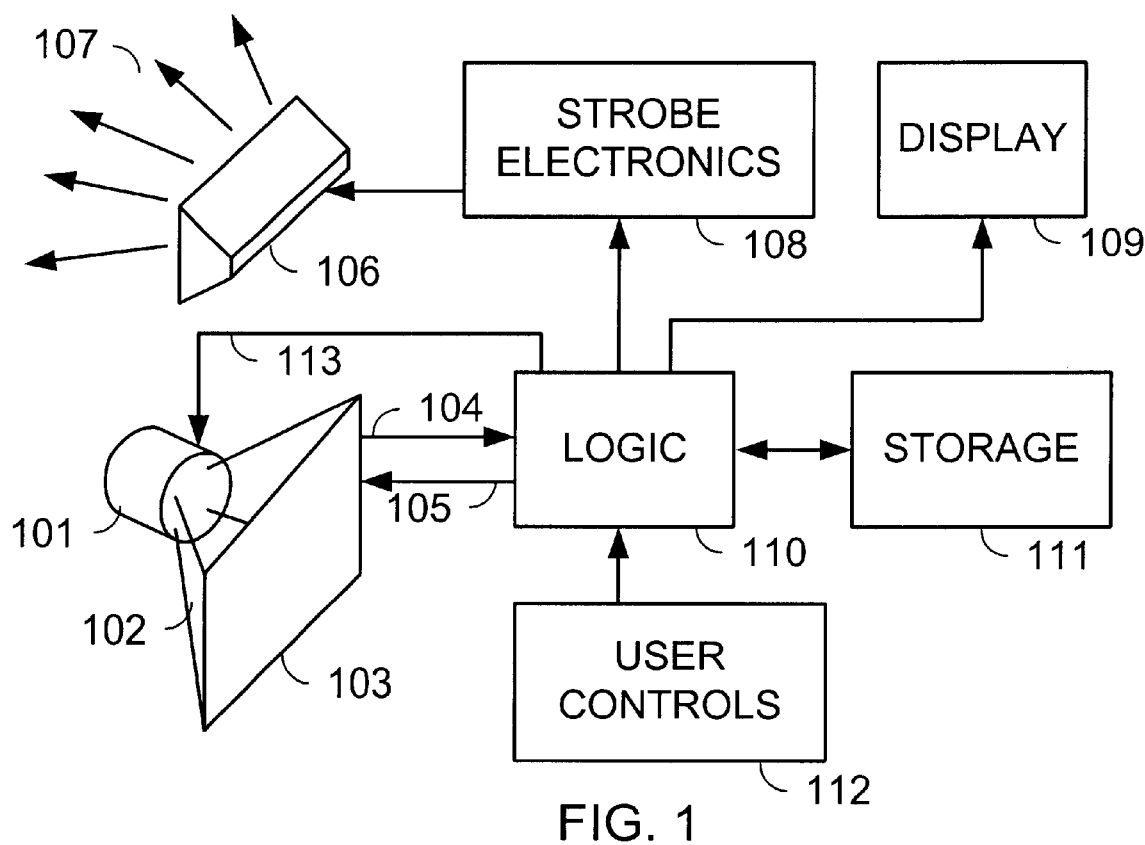
FIG. 1 is a simplified block diagram of a camera.

FIG. 1 shows a block diagram of a camera. The lens (101) gathers light from a scene (not shown). The gathered light is redirected (102) to form an image of the scene on a sensor (103). The sensor may be an array of CCD elements, CMOS sensors, or the like. The operation of the lens may be controlled by control signals (113) from a logic unit (110) which contains a microprocessor system. Likewise the operation of the sensor may be controlled by control signals (105) from logic unit (110). Image information signals (104) flow from the sensor to the logic unit (110). A flash, or strobe (106) may be utilized to supply additional light (107) to the scene. The strobe is operated by the strobe electronics (108), which in turn are controlled by the logic unit (110). The camera may comprise a display (109) on which image data may be shown. The camera may comprise a storage unit (111) for storage and recall of image data, as well as data interchange with other devices (not shown). The user of the camera may operate various control inputs (112) in order to affect the operation of the camera.

Figure 2:
FIG. 2 is a print of a photograph that has a very bright object in the scene.

FIG. 2 shows a photograph of a scene that contains a small area of very bright light. In this case a lamp that is switched on is included in the picture. It is apparent from the photograph that the camera used to make the photograph has used settings that make the resulting picture too dark. The photograph could be significantly improved by a better method of selecting camera settings affecting exposure.

A digital camera, or an exposure sensor for a film camera, by its nature, produces a numerical representation of each photograph it takes. For each location in the photograph, called a "picture element" or "pixel", the camera records a numerical value indicating the brightness of the scene at that location. The resulting representation of the scene is then an array of numbers. Locations in the array correspond to specific pixels, or locations in the scene, and the number stored at each array location represents the scene brightness at that location.

Optionally, the camera may also record information about the color at each pixel location of the scene being photographed. For the purpose of describing the present invention, we are concerned only with the brightness of each pixel. A measure of the brightness of a pixel may be computed from the color information. For example, many cameras represent the color of a pixel using three components indicating the contribution of red, green, and blue wavelengths of light to the brightness of that pixel. The overall brightness of a pixel may be computed as the sum of the red, green, and blue contributions, as a weighted sum, or as some other combination of the color information. A variety of methods for computing the brightness of a pixel from color information are well known in the art. It will be readily apparent to those skilled in the art that the present invention applies with equal facility to cameras that record only brightness information about each pixel and to cameras that also record color information.

Figure 3:
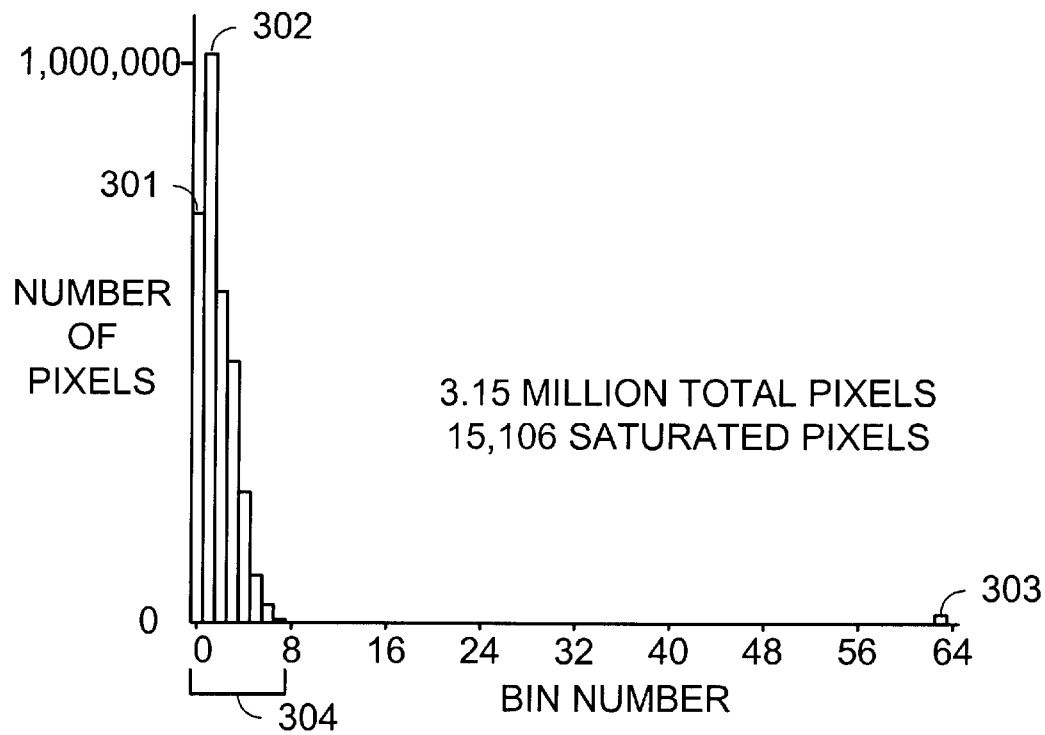
FIG. 3 is an exposure histogram of the scene shown in FIG. 2, which was taken using a prior method of selecting the strobe energy.

A common and useful tool for analyzing photographic exposure is the exposure histogram. FIG. 3 shows the exposure histogram for the scene shown in FIG. 2. An exposure histogram is constructed by dividing the exposure range of the camera into different "bins", and then counting how many pixels from an image fall into each bin. For example, the camera used to generate FIG. 2 can express the brightness of a pixel as a value between 0 and 1,023, inclusive. The histogram in FIG. 3 divides this brightness range into 64 bins. Therefore, bin 0 (301) collects a count of the pixels in the image whose brightness values fall between 0 and 15, inclusive. Bin 1 (302) collects a count of the pixels in the image whose brightness values fall between 16 and 31 inclusive. Subsequent bins follow the same pattern, finishing with bin 63 (303), which collects a count of image pixels whose brightness values fall between 1,008 and 1,023, inclusive.

Those pixels whose brightness values fall into bin 63 (303) are fully exposed, or saturated. Adding more exposure to those pixels will not affect their placement in a bin. The camera cannot record brightness values beyond 1,023. Pixels brighter than a level that would result in a brightness value of 1,008 or higher will always be reported as falling in bin 63 (303). Those pixels will not respond to increases in the exposure of the photograph.

However, reducing the exposure of those pixels may lower the brightness values reported for them, and may cause some or all of them to be counted in lower-numbered bins.

In general, it is desirable to minimize the number of pixels in the lowest-numbered bin, as well as minimize the number of saturated pixels in a photograph, as both of these conditions often represent loss of photographic information. A camera typically will adjust the strobe energy to place the bulk of the pixels in the photograph in bins representing an average brightness for a typical scene, while attempting to further adjust its strobe energy so as to minimize the number of pixels in the extreme bins.

It is the desire to minimize the number of saturated pixels in an image that can lead conventional methods of strobe energy selection to result in poor quality photographs when the scenes being photographed contain small areas of very bright light. The photograph of FIG. 2 was taken by the conventional method of taking a trial photograph with a known strobe energy setting, analyzing the exposure histogram of the resulting image, computing a new value for the strobe energy, and then taking a final photograph.

Figure 4:
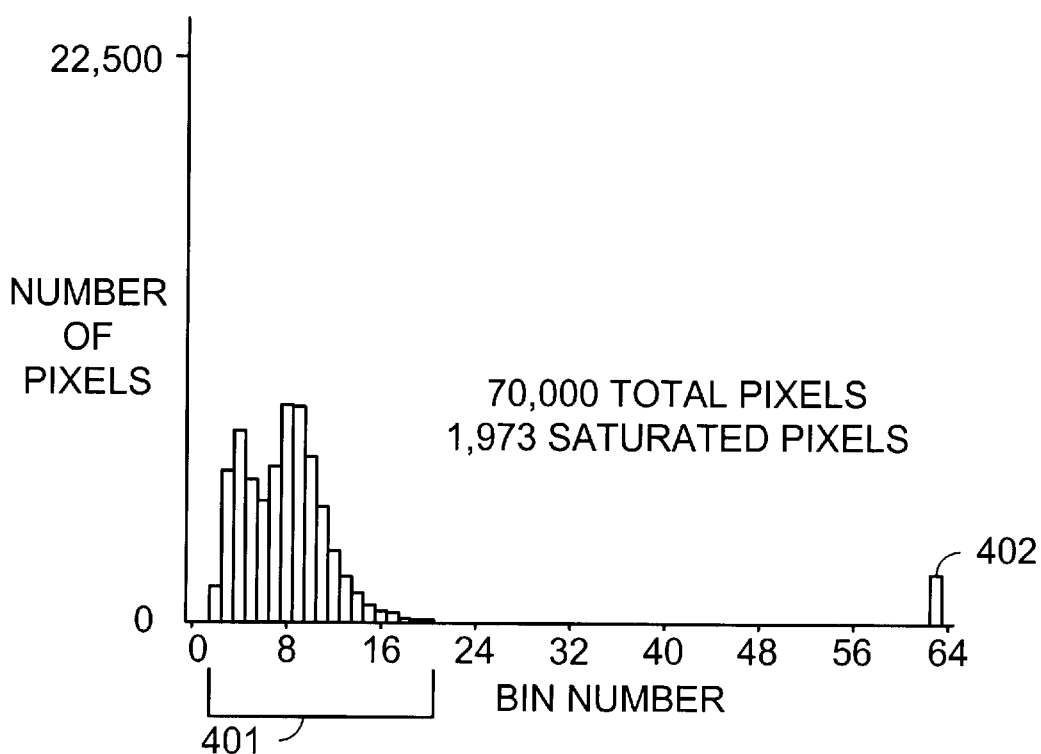
FIG. 4 is an exposure histogram of the scene shown in FIG. 2 when the scene is photographed using a trial strobe.

The exposure histogram of the trial photograph is shown in FIG. 4. The bulk of the pixels in the image fall into low-numbered bins, but are well distributed between approximately bins 2 and 22 (401). This would indicate a well-exposed photograph, were it not for the 1,973 saturated pixels falling in bin 63 (402). In an effort to improve the photograph, the camera assumed that the saturated pixels were due to excessive strobe energy, and therefore reduced the strobe energy before taking the final photograph of FIG. 2.

It is important to note that a trial photograph may have a different number of pixels than a final photograph due to CCD subsampling.

The exposure histogram of the image in FIG. 2 is shown in FIG. 3. We see that the resulting image has most if its pixels falling into histogram bins 6 and lower (304), indicating an underexposed photograph. However, a significant number of the image pixels still fall into bin 63 (303), indicating that the saturation of pixels was not eliminated by the reduction in strobe energy.

Thus the conventional method has resulted in an underexposed photograph.

This photograph could be manipulated using a digital computer to correct the exposure. However this approach is also often unsatisfactory, as the image modifications necessary to improve the exposure typically reveal or exaggerate objectionable noise in the image.

A far better solution would be to find a way for the camera to expose the photograph properly at the time the photograph is taken.

In an example embodiment of the invention, two trial photographs are taken—one without using the strobe, using only ambient light from the scene, and one using a pre-set strobe energy setting. The exposure settings used for both of these trial photographs, such as exposure time, lens aperture, and system gain, may be the same as the settings that will be used when the strobe is used in the final image capture. It is also possible that these settings could be different, in which case adjustments may be made to the resulting exposure histograms for accurate comparisons.

The exposure histogram of the ambient-light-only photograph is examined for the presence of saturated pixels. If saturated pixels are found, they cannot result from a trial strobe, because no strobe was used for this trial photograph. The saturated pixels must necessarily be due to very bright areas in the scene itself. Therefore, those pixels will not respond to changes in strobe energy, and may be discounted or ignored when computing the strobe energy to use for the final photograph.

Figure 5:
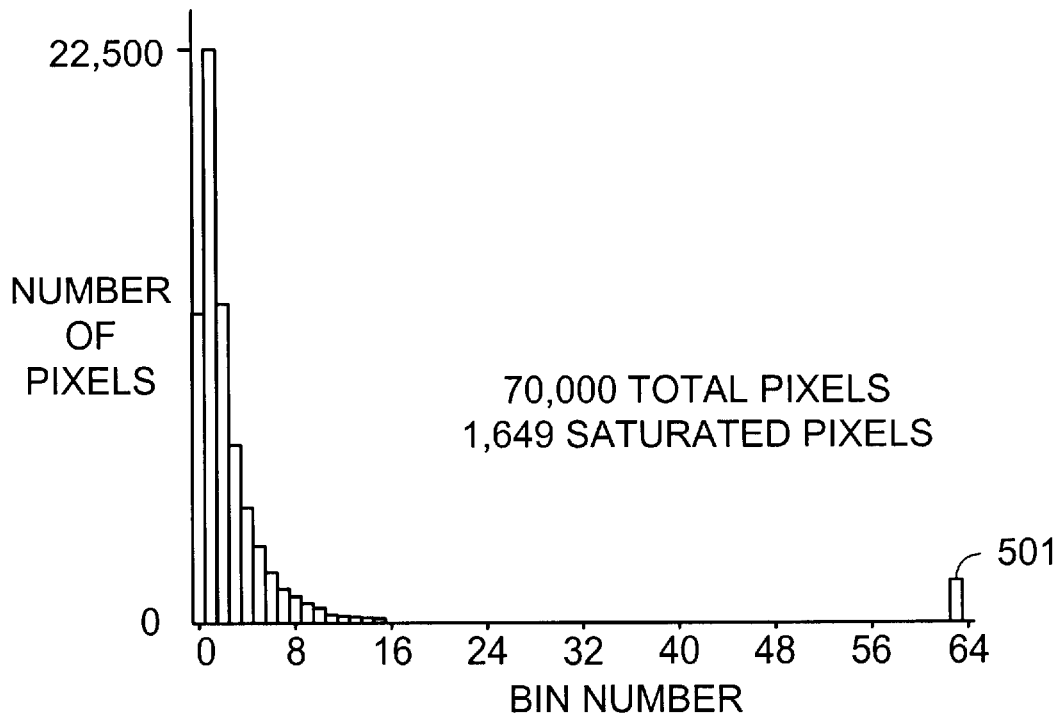
FIG. 5 is an exposure histogram of the scene shown in FIG. 2 when the scene is photographed using only ambient light.

For example, FIG. 5 shows the exposure histogram of the scene shown in FIG. 2 when taken without the strobe. This exposure histogram shows a generally underexposed image, but with 1,649 saturated pixels (501). Because no strobe was used, these pixels are saturated due to light sources contained within the scene, and will not respond to changes in the strobe energy.

This result is then combined with the information in FIG. 4, the exposure histogram of the same scene taken with a trial strobe. Only 324 more pixels are saturated in FIG. 4 than in FIG. 5. The camera bases its strobe power computation on an exposure histogram containing only 324 saturated pixels (along with the rest of the trial strobe exposure histogram) and thus reduces the power only slightly before taking the final photograph.

Figure 6:
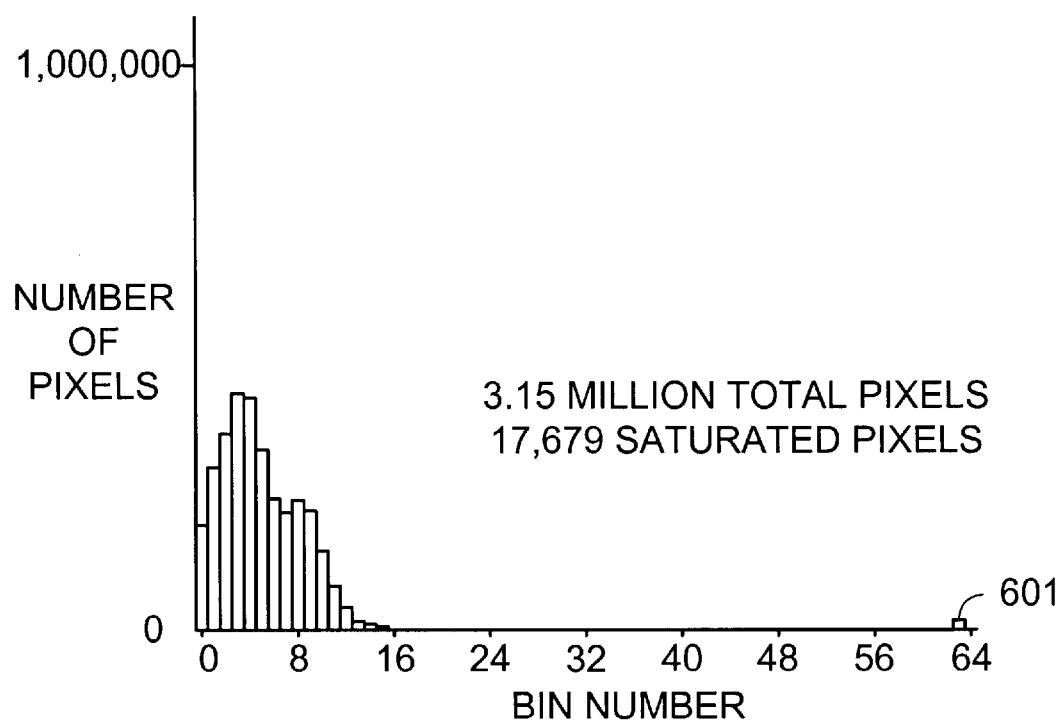
FIG. 6 is an exposure histogram of the scene shown in FIG. 2 when the scene is photographed in accordance with an embodiment of the invention.
Figure 7:
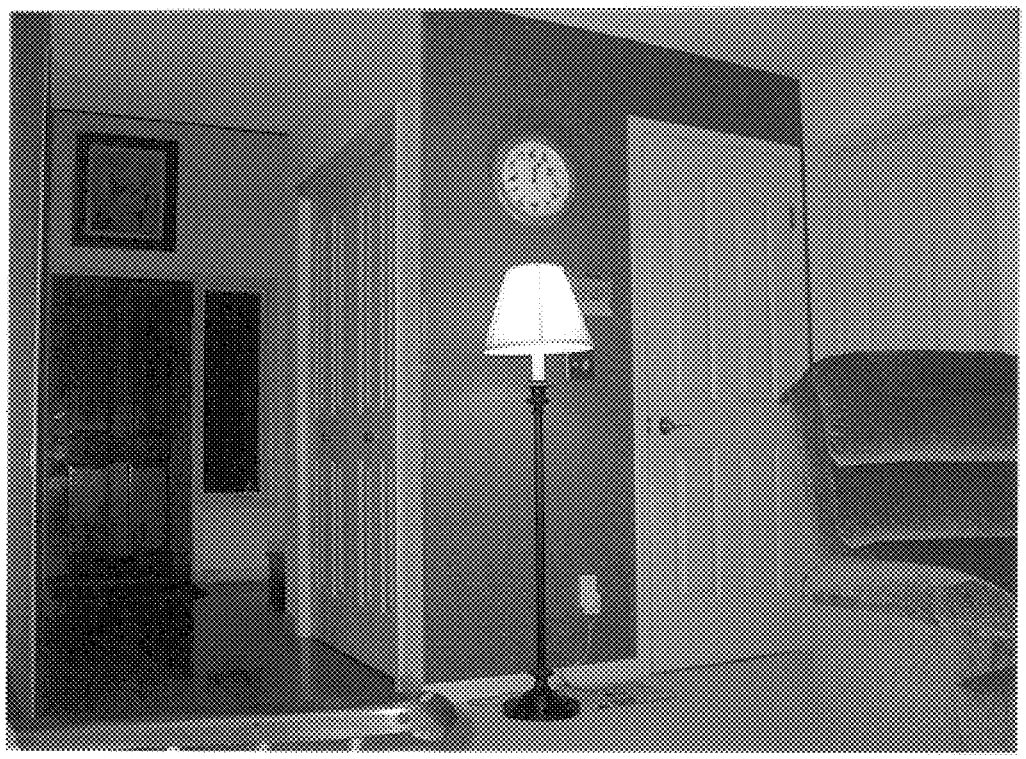
FIG. 7 is a print of a photograph of the scene shown in FIG. 2 that was obtained in accordance with an embodiment of the invention.

The exposure histogram of the final photograph is shown in FIG. 6. A similar proportion of the pixels are saturated (601) as were saturated in FIG. 3, the exposure histogram of the scene photographed by the conventional method, but the photograph as a whole is much better exposed.

Although the sample embodiment adds a step to the procedure for computing the strobe energy, it may not necessarily add to the time required for the camera to take a photograph. Typically, several trial photographs of a scene are taken in preparation for a final photograph for various reasons unrelated to strobe energy. It is likely that one of these other trial photographs could be used for determining the number of saturated pixels in the ambient-only image, and therefore the additional step does not necessarily require the camera to take an additional photograph.

Figure 8:
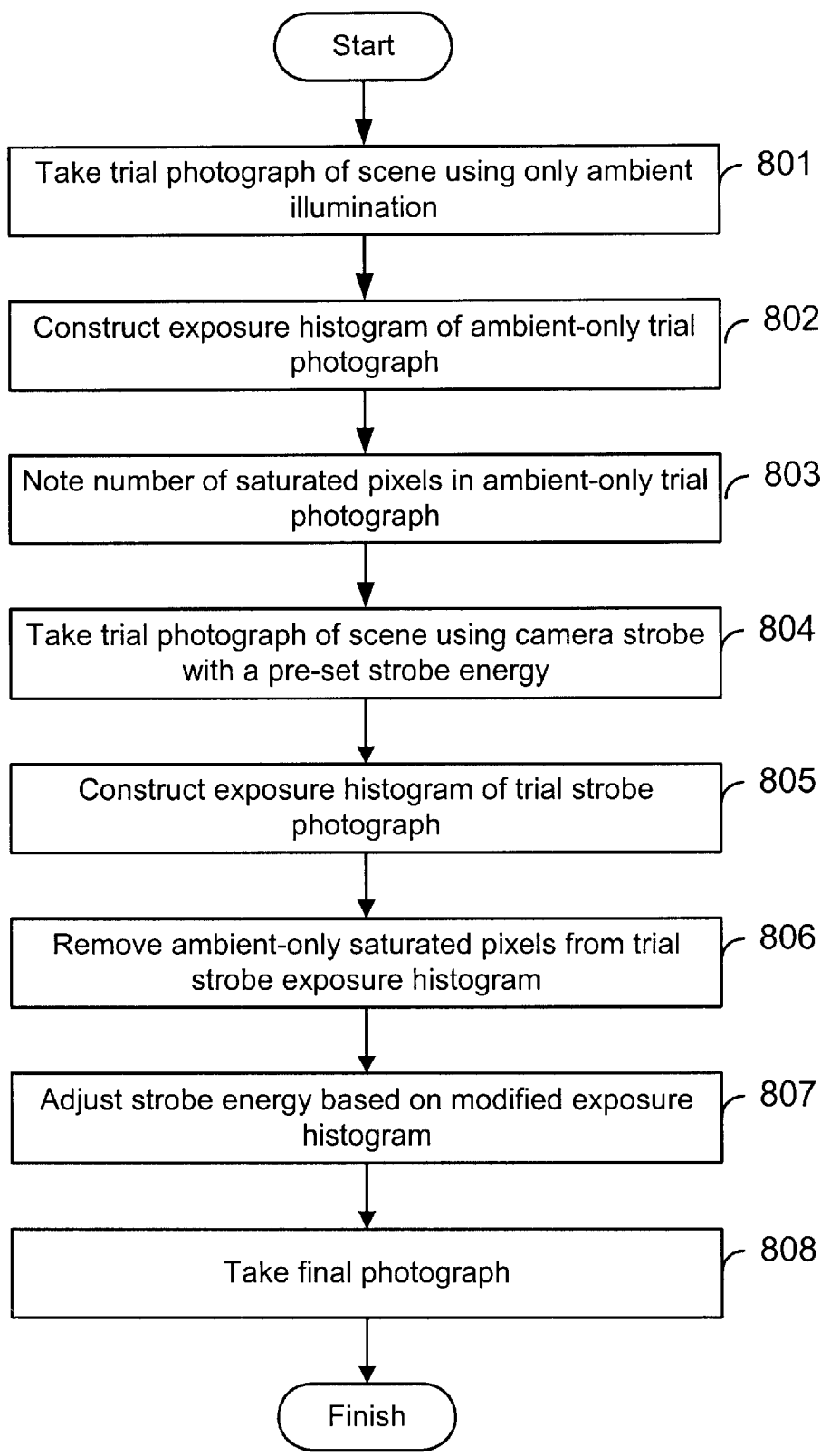
FIG. 8 is a flow chart in accordance with an embodiment of the invention.

FIG. 8 depicts a flow chart of an example embodiment of the invention. In step 801, a trial photograph is taken of the scene without using the camera strobe. That is, the trial photograph is taken with only ambient illumination.

In step 802, the exposure histogram of the ambient-only trial photograph is constructed.

In step 803, the number of saturated pixels in the ambient-only trial photograph is noted.

In step 804, a trial photograph is taken of the scene using the camera strobe with a pre-set strobe energy.

In step 805, the exposure histogram of the trial strobe photograph is constructed.

In step 806, the saturated pixels from the ambient-only trial photograph are removed from the exposure histogram of the trial strobe photograph.

In step 807, the camera uses the resulting exposure histogram to adjust the strobe energy.

In step 808, the camera takes a final photograph.

It should also be noted that while both the ambient-only and trial strobe photographs are taken before the final photograph, they may be taken in any order with respect to each other.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of setting the strobe energy in a camera comprising the steps of:
a) taking a first trial photograph of a scene using a pre-set strobe energy;
b) taking a second trial photograph of the scene using only ambient illumination;
c) identifying saturated pixels in the second trial photograph; and
d) combining information about the saturated pixels in the second trial photograph with information from the first trial photograph to compute a strobe energy for a final photograph.

2. The method of claim 1 further comprising the step of taking a final photograph.

3. The method of claim 1 wherein exposure histograms are used to gather information about the two trial photographs.

4. The method of claim 3 wherein:
a) saturated pixels are identified as those pixels residing in an exposure histogram bin representing the brightest pixels in the photograph; and
b) saturated pixels in the second trial photograph are discounted in importance before the calculation of the strobe energy for the final photograph.

5. The method of claim 4 where the number of saturated pixels in the second trial photograph is subtracted from the number of saturated pixels in the exposure histogram of the first trial photograph before the calculation of the strobe energy for the final photograph.

6. A camera, comprising:
a processor;
a strobe; and
the processor configured to modify data from a first trial photograph obtained using the strobe, using information from a second trial photograph obtained using ambient light only, and to use the modified data to compute a strobe energy for a final photograph.

7. The camera of claim 6 wherein exposure histograms are used to gather information about the two trial photographs.

8. The camera of claim 7 wherein:
a) saturated pixels are identified as those pixels residing in the exposure histogram bin representing the brightest pixels in the photograph; and
b) saturated pixels in the ambient-only trial photograph are discounted in importance before the calculation of the strobe energy for a final photograph.

9. The digital camera of claim 8 wherein the number of saturated pixels in the ambient-only trial photograph is subtracted from the number of saturated pixels in the trial strobe photograph exposure histogram before the calculation of the strobe energy for a final photograph.

10. A camera comprising:
a) means for obtaining a first photograph using ambient light;
b) means for obtaining a second photograph using a strobe;
c) means for identifying saturated pixels in the first photograph, and
d) means for combining information about the saturated pixels in the first photograph with information from the second photograph to compute a strobe energy for a final photograph.

* * * * *